United States Patent
Edwards

(10) Patent No.: US 7,088,488 B2
(45) Date of Patent: Aug. 8, 2006

(54) SPATIAL LIGHT MODULATOR DEVICE WITH DIFFUSIVE ELEMENT

(75) Inventor: Jathan D. Edwards, Afton, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/889,727

(22) Filed: Jul. 13, 2004

(65) Prior Publication Data
US 2006/0012845 A1    Jan. 19, 2006

(51) Int. Cl.
G02F 1/00 (2006.01)
G02B 26/00 (2006.01)
G03H 1/00 (2006.01)

(52) U.S. Cl. .................. 359/237; 359/227; 359/30; 359/28

(58) Field of Classification Search ............ 359/237, 359/227, 230, 231, 572, 291, 298, 223, 290, 359/292, 30, 28, 11, 12, 13, 14, 454, 456; 369/112.1, 112.13; 349/58, 62; 356/300, 356/303; 345/6, 87
See application file for complete search history.

(56) References Cited

U.S. PATENT DOCUMENTS

| 4,104,489 | A |   | 8/1978  | Satoh et al. ............... 369/103 |
| 5,307,184 | A |   | 4/1994  | Nishiwaki et al. .......... 359/30 |
| 5,311,033 | A |   | 5/1994  | Disanayaka ............... 250/591 |
| 5,461,475 | A | * | 10/1995 | Lerner et al. ............. 356/300 |
| 5,652,666 | A | * | 7/1997  | Florence et al. ........... 359/22 |
| 5,703,664 | A | * | 12/1997 | Jachimowicz et al. ....... 349/58 |
| 5,719,691 | A |   | 2/1998  | Curtis et al. .............. 359/11 |
| 5,768,242 | A | * | 6/1998  | Juday ..................... 369/94 |
| 5,777,588 | A | * | 7/1998  | Woodgate et al. .......... 345/6 |
| 6,504,810 | B1| * | 1/2003  | Itoh et al. ................ 369/103 |
| 6,538,776 | B1|   | 3/2003  | Edwards .................. 359/29 |
| 6,721,076 | B1| * | 4/2004  | King et al. ............... 359/35 |
| 6,762,865 | B1|   | 7/2004  | Edwards .................. 359/31 |
| 2005/0162737 | A1 | * | 7/2005 | Whitehead et al. ........ 359/454 |

OTHER PUBLICATIONS

Chapter 6: Technical Evaluation of Work, http://www.wtec.org/loyola/dsply_jp/c6_s3.htm.
"Holographic Data Storage Using SLM With PDLC Optical Elements," U.S. Appl. No. 10/889,728, filed Jul. 13, 2004.

* cited by examiner

Primary Examiner—Ricky Mack
Assistant Examiner—M. Hasan
(74) Attorney, Agent, or Firm—Eric D. Levinson

(57) ABSTRACT

The invention is directed to a spatial light modulator device that can improve holographic data recording systems, and various methods and systems incorporating the device. The spatial light modulator device includes a diffusive element to diffuse or scatter a data encoded object beam. For example, the diffusive element may comprise a two-layer diffusive laminate formed, a polymer dispersed liquid crystal material, or another diffusive material. The diffusive element can be formed over the output window, or may comprise the output window of the spatial light modulator device. In any case, the diffusive element can slightly scatter the data encoded object beam, which can significantly reduce undesirable zero-order burning effects in a holographic medium positioned in proximity to a Fourier transform plane.

15 Claims, 4 Drawing Sheets

SPATIAL LIGHT MODULATOR DEVICE WITH DIFFUSIVE ELEMENT

TECHNICAL FIELD

The invention relates to holographic data storage systems, and more particularly to spatial light modulator devices used to encode information into object beams of holographic data storage systems.

BACKGROUND

Many different types of data storage media have been developed to store information. Traditional data storage media, for instance, include magnetic media, optical media, magneto-optic media, capacitive media, and mechanical media to name a few. Increasing data storage density is a paramount goal in the development of new or improved types of data storage media.

In traditional media, individual bits are stored as distinct mechanical, optical, capacitive, or magnetic changes on the surface of the media. For this reason, medium surface area generally poses physical limits on data densities of traditional media.

Holographic data storage media can offer higher storage densities than traditional media. In a holographic medium, data is stored throughout the volume of the medium rather than the medium surface. Moreover, data can be superimposed within the same medium volume using multiplexing techniques. For these reasons, theoretical holographic storage densities can approach tens of terabits per cubic centimeter.

In holographic data storage media, entire pages of information, e.g., bit maps, can be stored as optical interference patterns within a photosensitive holographic recording material. This is done by intersecting two coherent laser beams within the photosensitive material. The first laser beam, called the object beam, is encoded with the information to be stored. The second laser beam, called the reference beam, interferes with the encoded object beam to create an interference pattern that is stored in the holographic recording material as a hologram.

A spatial light modulator device is typically used to encode the information into the object beam for holographic recording. A spatial light modulator device may include a set of optical elements that affect input light in order to encode a bit map in the object beam. For example, a reflective spatial light modulator device may include a set of specular mirrors that are individually controlled to define bits in the bit map. Alternatively, a transmissive spatial light modulator device may include a set of elements that can be made transmissive or opaque in order to either pass or block light and thereby define the bits of the bit map. In either case, when the object beam illuminates the spatial light modulator device, the spatial light modulator device can encode the information into the object beam. The object beam is then made to interfere with a reference beam to record a hologram in the medium.

When a stored hologram is later illuminated with only the reference beam, some of the reference beam light is diffracted by the hologram interference pattern. Moreover, the diffracted light can be directed to reconstruct the original object beam. Thus, by illuminating a recorded hologram with the reference beam only, the data encoded in the object beam can be reconstructed and detected by a data detector such as a camera or other image capture device. In this manner, information stored in a recorded hologram can be read from a holographic medium.

One problem in holographic recording systems is referred to as "zero-order burning." In particular, when Fourier transformed holograms are recorded, light intensity near the center of the object beam may significantly exceed light intensity near the edges of the object beam. For example, following a Fourier transformation of a data encoded object beam, the zero-order Fourier component of the holographic beams manifests this undesirable light intensity. The zero-order Fourier component of the holographic beam carries only information relating to the average intensity of the beam, and carries substantially none of the information encoded in the beam. The significant light intensity of the zero-order Fourier component near the center of the object beam can cause significant and undesirable exposure to the holographic medium at the Fourier transform plane, and can negatively impact the storage capacity of holographic media.

SUMMARY

In general, the invention is directed to a spatial light modulator device that can improve holographic data recording systems. The spatial light modulator device incorporates a diffusive element to scatter a data encoded object beam. As examples, the diffusive element may comprise a two-layer diffusive laminate, a polymer dispersed liquid crystal material, or another material that adequately scatters the encoded object beam. The diffusive element can be formed over an output window of the spatial light modulator device. Although the diffusive element scatters the data encoded object beam, reconstruction of the scattered object beam may be sufficient to facilitate readout, particularly if the scattering begins at an image plane of the holographic recording system. The scattering can significantly reduce undesirable zero-order burning effects.

In one embodiment, the invention provides a spatial light modulator device comprising a set of controllable optical elements to create a data encoded object beam from an input light source, and a diffusive element positioned in proximity to the set of controllable optical elements to diffuse the data encoded object beam.

In another embodiment, the invention provides a method comprising encoding data into a light beam using a set of controllable optical elements of a spatial light modulator device, and diffusing the encoded light beam using a diffusive element of the spatial light modulator device, the diffusive element being positioned in proximity to the set of controllable optical elements.

In another embodiment, the invention provides a holographic data storage system comprising a holographic medium, a laser to create a laser beam, and optical elements to separate the laser beam into a reference beam and an input light source. The holographic data storage system also includes a spatial light modulator device positioned at an image plane. The spatial light modulator device comprises a set of controllable optical elements to create a data encoded object beam from the input light source, and a diffusive element positioned in proximity to the set of controllable optical elements to diffuse the data encoded object beam. The system is arranged such that the data encoded object beam and reference beam interfere in the holographic medium at a Fourier transform plane to create a hologram in the holographic medium.

In an added embodiment, the invention provides a spatial light modulator device comprising a housing formed with a window, and a set of controllable optical elements within the housing, wherein the controllable optical elements comprise controllable diffusive mirrors.

The various embodiments of the invention may provide one or more advantages. In particular, incorporation of a diffusive element into a spatial light modulator device can scatter the data encoded object beam to substantially reduce undesirable zero-order burning effects. By positioning the diffusive element in close proximity to the controllable elements of the spatial light modulator device, the scattering can be performed very close to the image plane within the holographic system. Accordingly, reconstruction of the slightly scattered object beam may be sufficient to facilitate readout. At other locations of the system, e.g., at the Fourier transform plane, the scattering effects may be more significant without affecting reconstruction of the object beam. Accordingly, if media is recorded at or near the Fourier transform plane, scattering of the zero-order Fourier component may be significant, thereby avoiding zero-order burning or overexposure of the medium at the Fourier transform plane.

The details of one or more embodiments of the invention are set forth in the accompanying drawings and the description below. Other features, objects, and advantages of the invention will be apparent from the description and drawings, and from the claims.

DETAILED DESCRIPTION

The invention is directed to a spatial light modulator device that can improve holographic data recording systems, and various methods and systems incorporating the device. The spatial light modulator device includes a diffusive element to diffuse or scatter a data encoded object beam. For example, the diffusive element may comprise a two-layer diffusive laminate formed over an output window of the spatial light modulator device, or a polymer dispersed liquid crystal material. However, other diffusive materials may be used. The diffusive element can be formed over the output window, or can form at least a portion of the output window of the spatial light modulator device. In any case, the diffusive element slightly scatters the data encoded object beam, which can significantly reduce undesirable zero-order burning effects. In general, the diffusive element will scatter the date encoded object beam to an extent sufficient to reduce zero-order burning effects while still maintaining the integrity of the encoded data.

In one example, a two-layer diffusive laminate comprising a textured polycarbonate layer roll-embossed onto an acrylated epoxy adhesive layer is formed over an output window of a spatial light modulator device. The spatial light modulator device includes a set of optical elements, such as a set of controllable mirrors or a set of controllable elements that can be made transmissive or opaque. The controllable optical elements encode a bit map into an object beam, which is scattered by the diffusive element. In particular, the diffusive element may uniformly scatter substantially all of the encoded object beam, albeit only to the extent needed to reduce zero order burning at the center of the Fourier transformed version of the beam.

Reconstruction of the scattered object beam, which is encoded with the bit map, can be achieved because the scattering by the diffusive element occurs in close proximity to an image plane of the holographic system. However, the scattering becomes more significant at other locations, such as the Fourier transform plane of the holographic system. Accordingly, Fourier transform holograms, which are stored in the medium at the Fourier transform plane, will be scattered to thereby reduce or eliminate zero-order burning of the photosensitive material of the medium by such Fourier transformed holograms.

Figure 1:
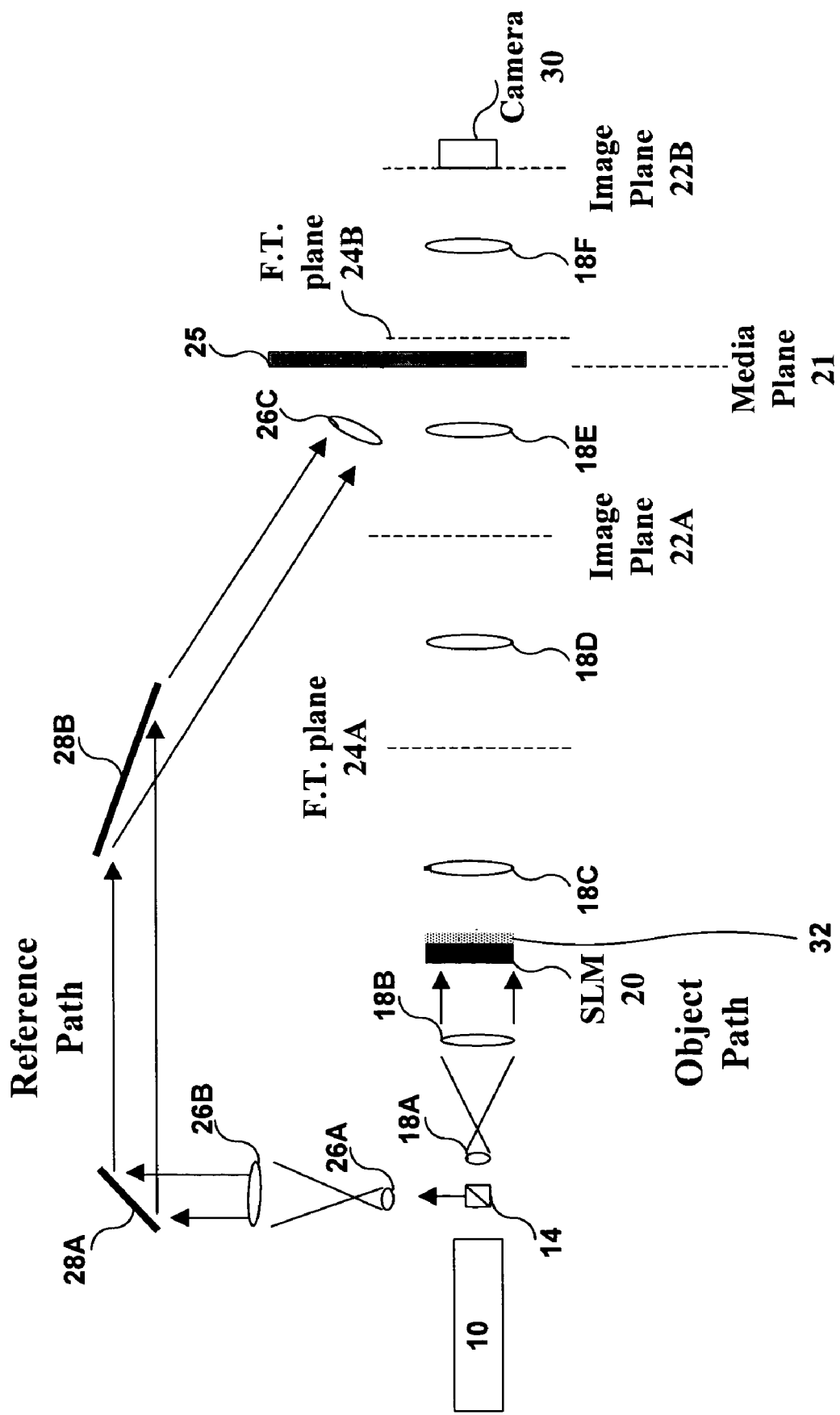
FIG. 1 is a conceptual diagram of a holographic recording system according to an embodiment of the invention.

FIG. 1 is a conceptual diagram illustrating a system for holographic recording according to an embodiment of the invention. The system illustrated in FIG. 1 is only exemplary, as a wide variety of other systems or optical arrangements could also benefit from the spatial light modulator device designs described herein. As shown in FIG. 1, laser 10 produces laser light that is divided into two components by beam splitter 14. These two components that exit beam splitter 14 generally have an approximately equal intensity and may be spatially filtered to eliminate optical wave-front errors.

The first component exits beam splitter 14 and follows an object path. This "object beam" may then pass through a collection of object beam optical elements 18A–18E and a data encoder such as a spatial light modulator device 20. For instance, lens 18A and lens 18B may form a laser beam expander to provide a collimated beam to spatial light modulator device 20.

Spatial light modulator device 20 encodes data in the object beam, for instance, in the form of a holographic bit map (or pixel array). In particular, spatial light modulator device 20 includes a set of controllable elements that can be individually controlled to define bit maps for holographic recording. The controllable optical elements may comprise elements that can be made transmissive or opaque to either pass or block individual portions of the input light in the object path. Alternatively, the controllable optical elements may comprise mirrors that can be individually oriented to affect input light in the object path. In these ways, a holographic bit map is encoded into the object beam by spatial light modulator device 20. Spatial light modulator 20 defines an original image plane in the system.

In accordance with the invention, spatial light modulator device 20 incorporates a diffusive element 32 to diffuse the data encoded object beam. Diffusive element 32 may comprise a two-layer diffusive laminate. The two-layer diffusive laminate may be formed over an output window of spatial light modulator device, or may comprise and possibly replace a conventional output window. Diffusive element 32 may alternatively comprise a polymer dispersed liquid crystal material, or another diffusive material. In any case, diffusive element 32 can slightly scatter the object beam at a location in very close proximity to the image plane defined by spatial light modulator 20, which can significantly reduce undesirable zero-order burning effects at a subsequent Fourier transform plane without causing significant problems for bit-map reconstruction and readout.

The encoded object beam, which is scattered by diffusive element 32, passes through lenses 18C, 18D, and 18E before illuminating a holographic recording media plane 21. Accordingly, the scattering by diffusive element 32 should not be excessive to ensure that the light can be collected by lens 18C, 18D, and 18E. In this exemplary "4F" configuration, lens 18C is located one focal length from the original image plane defined by spatial light modulator device 20, and one focal length from Fourier transform plane 24A. Lens 18D is located one focal length from Fourier transform plane 24A and one focal length from image plane 22A. Lens 18E is located one focal length from image plane 22A and one focal length from Fourier transform plane 24B.

The second light component of laser 10, which exits beam splitter 14, follows a reference path that is different from the object path. This "reference beam" is directed by reference beam optical elements such as lenses 26A–26C and mirrors 28A–28B. The reference beam illuminates the holographic recording media plane 21, interfering with the data encoded object beam to create a hologram on medium 25.

By way of example, medium 25 may take the form of a disk or a card, or any other holographic media format. For example, medium 25 may have a sandwich construction in which a photosensitive material is sandwiched between two optically clear glass or plastic substrates. Tracking patterns may be included on the substrate, and may be read by a separate probe beam (not shown). The holograms generally comprise a pixel array or bit map that is encoded in the object beam. The object beam and reference beam interfere in the photosensitive material of medium 25 to create the hologram.

When recording a hologram, storage medium 25 is typically located at or near one of the Fourier transform planes. Using this system, the data encoded in the object beam by spatial light modulator device 20 is recorded in medium 25 by simultaneously illuminating both the object and the reference paths so that the object beam and reference beam interfere in the photosensitive material. Diffusive element 32 of spatial light modulator device 20 reduces undesirable zero-order burning that can otherwise overexpose portions of medium 25 during recording at or near Fourier transform plane 24B.

After a hologram has been stored on the medium 25, the data encoded in the hologram may be read by the system. For readout of the data, only the reference beam is allowed to illuminate the hologram on medium 25. Light diffracts off the hologram stored on medium 25 to reconstruct or "recreate," the object beam. This reconstructed object beam passes through lens 18F permitting a reconstruction of the bit map that was encoded in the object beam to be observed at image plane 22B. Therefore, a data detector, such as camera 30, can be positioned at image plane 22B to read the data encoded in the hologram. While the reconstructed object beam will include some slight scattering, the scattering will be minimal because diffusive element 32 is located in close proximity to an image plane. In particular, the scattering seen at media plane 21 should be substantially similar to the scattering seen at the output of spatial light modulator device 20.

The holographic bit map encoded by spatial light modulator device 20 may comprise one "page" of holographic data. For instance, the page may be an array of binary information that is stored in a particular location on the holographic medium as a hologram. By way of example, a typical page of holographic data may comprises a 1000 bit by 1000 bit pixel array that is stored in a few square millimeters of medium surface area. In other cases, however, any sized pixel array could be defined, e.g., having any number or plurality of pixels. Accordingly, the spatial light modulators may define any number or plurality of controllable optical elements. Pixels having dimensions greater than 1 micron should not have any significant readout problems, even if the pixels are scattered at an image plane by diffusive element 32.

Figure 2:
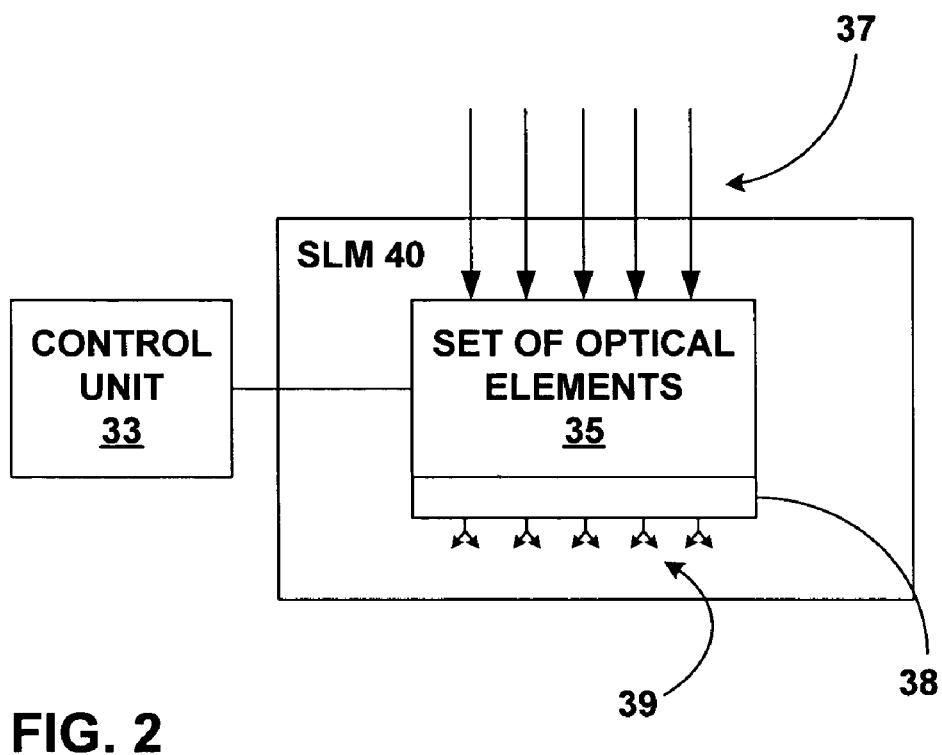
FIG. 2 is a block diagram of a spatial light modulator device according to an embodiment of the invention.

FIG. 2 is a block diagram of spatial light modulator device 40, which may correspond to spatial light modulator device 20 of FIG. 1, or may be used in other systems. Spatial light modulator device 40 includes a set of optical elements 35 that are individually controllable via control unit 33. Optical elements 35 may comprise elements that can be made transmissive or opaque in response to control signals from control unit 33 to either pass or block individual portions of input light 37. Alternatively, optical elements 35 may comprise mirrors that can be individually oriented by control unit 33 to affect input light 37. If mirror elements are used in a reflective-type spatial light modulator, however, the output light may exit from the same side as the input light. In that case, the diffusive element described herein may only cover part of the input/output window such that non-scattered light can be input to the device, reflected by the elements, and then scattered by the diffusive element. In an added embodiment, the desired scattering can be achieved by using controllable diffusive mirrors rather than conventional specular mirrors in a reflective-mode spatial light modulator device. In that case, the diffusive mirrors may be reflectively diffusive, as opposed to non-diffusive specular reflective mirrors used in conventional spatial light modulators.

In any case, a holographic bit map can be encoded into input light 37, and then used as an object beam in holographic data recording. Control unit 33 may comprise a software module that executes in a general purpose microprocessor in an operating system environment. Control unit 33, for example, may be implemented as software and executed on the processor of a separate computer or workstation. Control unit 33 may form part of a software driver for a holographic media drive.

As described herein, spatial light modulator device 40 incorporates a diffusive element 38 to diffuse light 39 as the light exits spatial light modulator device 40. Again, by incorporating diffusive element 38 as part of spatial light modulator device 40, scattering can be performed at the image plane of a holographic system. Moreover, this scattering becomes more extensive at the Fourier transform plane. Thus, while slight scattering at the image plane ensures that the bit map image can be reconstructed, more extensive scattering at the Fourier transform plane reduces zero-order burning when holograms are recorded at the Fourier transform plane.

Diffusive element 38 may comprise a two-layer diffusive laminate formed over an output window of spatial light modulator device 40, or may comprise and possibly replace a conventional output window. Diffusive elements 38 may alternatively comprise a polymer dispersed liquid crystal material, or another diffusive material. In any case, diffusive element 38 can slightly scatter the object beam in very close proximity to the image plane, which can significantly reduce undesirable zero-order burning effects at the Fourier transform plane without causing significant problems for bit-map reconstruction and readout.

Figure 3:
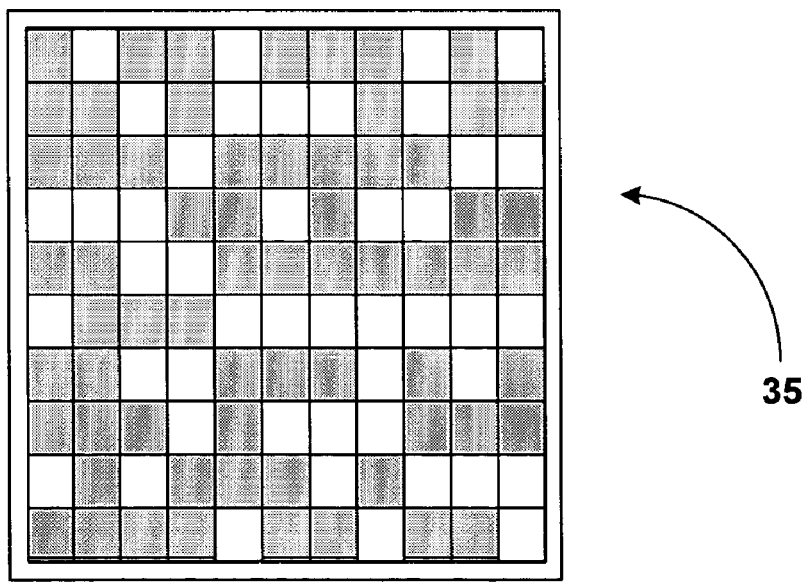
FIG. 3 a conceptual diagram of a set of controllable optical elements of a spatial light modulator device.

FIG. 3 is a conceptual view of optical elements 35. Again, optical elements 35 may comprise mirrors that can be individually oriented by control unit 35 to affect the light input to spatial light modulator device 40. Alternatively, optical elements 35 may comprise elements that can be made transmissive or opaque in response to control signals from control unit 33 to either pass or block individual portions of the input light. In these ways, a holographic bit map can be encoded into input light 37, and then used as an object beam in holographic data recording. Optical elements 35 are individually controlled to define "on" or "off" bits of the bit maps stored as holograms. In an added embodiment, optical elements 35 may comprise controllable diffusive mirrors rather than conventional specular mirrors. In that case, elements 35 may be reflectively diffusive, in contrast to non-diffusive specular reflective mirrors used in conventional spatial light modulators.

Figure 4:
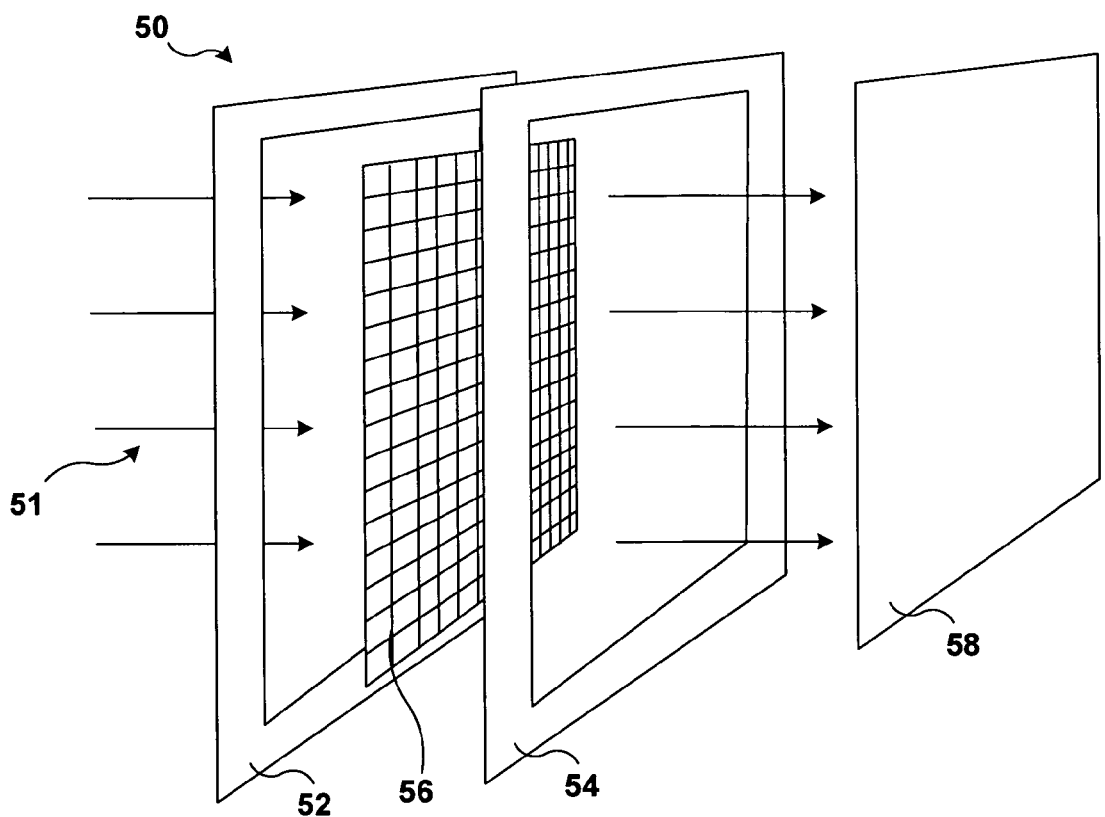
FIG. 4 is an exploded conceptual assembly view of a spatial light modulator device according to an embodiment of the invention.
Figure 5:
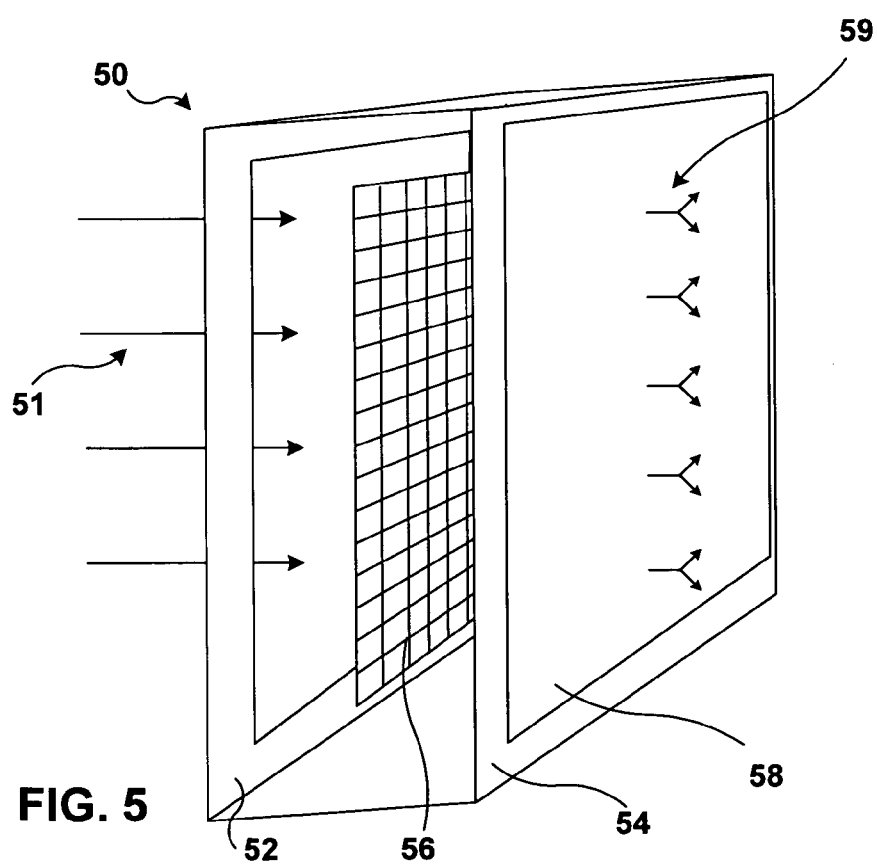
FIG. 5 a perspective conceptual view of a spatial light modulator device according to an embodiment of the invention.

FIG. 4 is an exploded conceptual view of a spatial light modulator device 50 according to an embodiment of the invention. FIG. 5 a perspective conceptual view of the spatial light modulator device shown in FIG. 4. In the example of FIGS. 4 and 5, spatial light modulator device 50 includes an input window 52, an output window 54, and a set of optical elements 56 between windows 52, 54. Windows 52, 54 may form part of a housing that houses optical elements 56. Optical elements 56 may comprise elements that can be made transmissive or opaque in response to control signals. Windows 52, 54 may be optically transparent, e.g., formed of glass or another transparent or translucent material. In other embodiments, however, optical elements 56 may comprise mirrors that can be individually oriented to affect the light input through input window. In that case, the diffusive element described herein may only cover part of the input/output window such that non-scattered light can be input to the device, reflected by the elements, and then scattered by the diffusive element.

In the transmissive example of FIG. 4, diffusive element 58 is formed over output window 54. For example, diffusive element 58 may be formed over a glass plate that defines a transparent inner portion of window 54. Alternatively, diffusive element 58 may comprise output window 54 and replace a conventional glass plate. For reflective-mode modulator devices, the diffusive element may only cover part of a common input/output window, e.g., the portion corresponding to the output. In any case, diffusive element 58 scatters input light 51 that is encoded by optical elements 56. Accordingly output light 59 is not only encoded with the information by elements 56, but also scattered by diffusive element 58.

The distance between diffusive element 58 and optical elements 56 should be sufficiently small to ensure that the information encoded into the light is preserved at output window 54. However, the required distance will also be dependent upon the diffusive characteristics of diffusive element 58. For the diffusive materials described herein, the distance between diffusive element 58 and optical elements 56 should typically be less than a few millimeters in order to ensure that the images are substantially coherent at the image plane. For example, the distance between diffusive element 58 and optical elements 56 may be less than 5 millimeters.

Again, by incorporating diffusive element 58 as part of spatial light modulator device 50, scattering can be performed at the image plane of a holographic system. The scattering becomes more significant as the light disseminates from spatial light modulator device 50. Thus, the scattering may be significant at a Fourier transform plane, allowing for holographic recording at the Fourier transform plane and reductions in zero-order burning effects.

As described in greater detail below, diffusive element 56 may comprise a two-layer diffusive laminate, a polymer dispersed liquid crystal material, or another diffusive material. In any case, diffusive element 58 can slightly scatter the object beam defined by input light 51 and encoded. The scattering should not be so excessive so as to direct output light 59 away from subsequent lenses or collection optics. Scattering of a few degrees can provide the desirable reductions in zero-order burning at the Fourier transform plane, while avoiding loss of light in the subsequent lenses or collection optics of the holographic recording system. The form of diffusive element 56 should be defined with these factors in mind.

Figure 6:
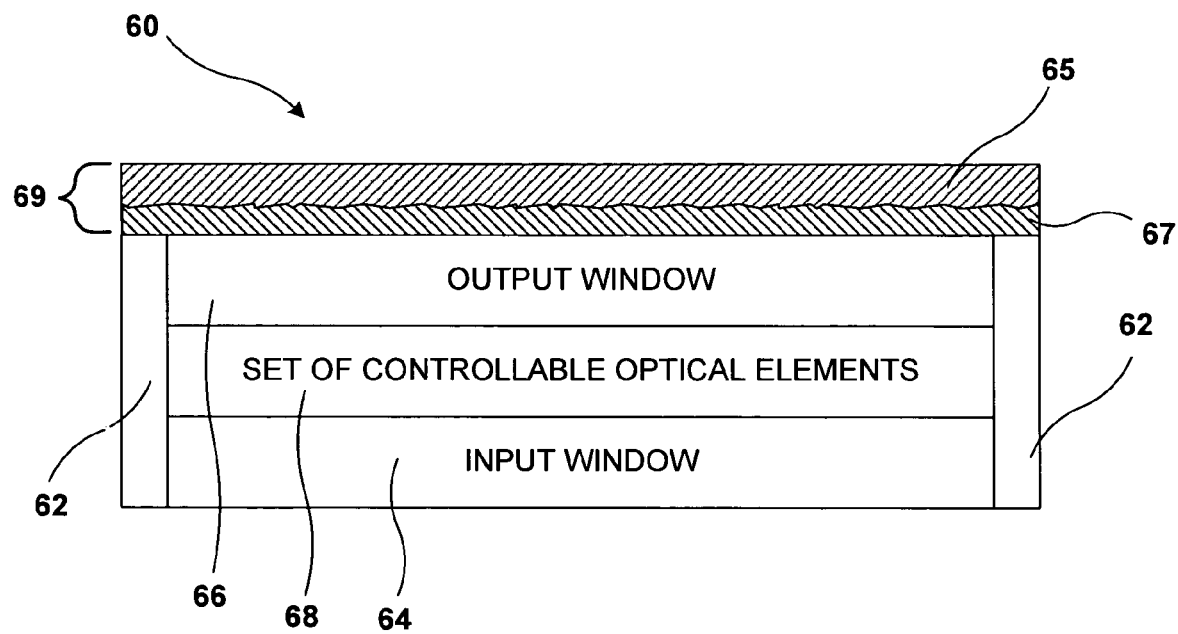
FIGS. 6 and 7 are conceptual side views of spatial light modulator devices according to embodiments of the invention.
Figure 7:
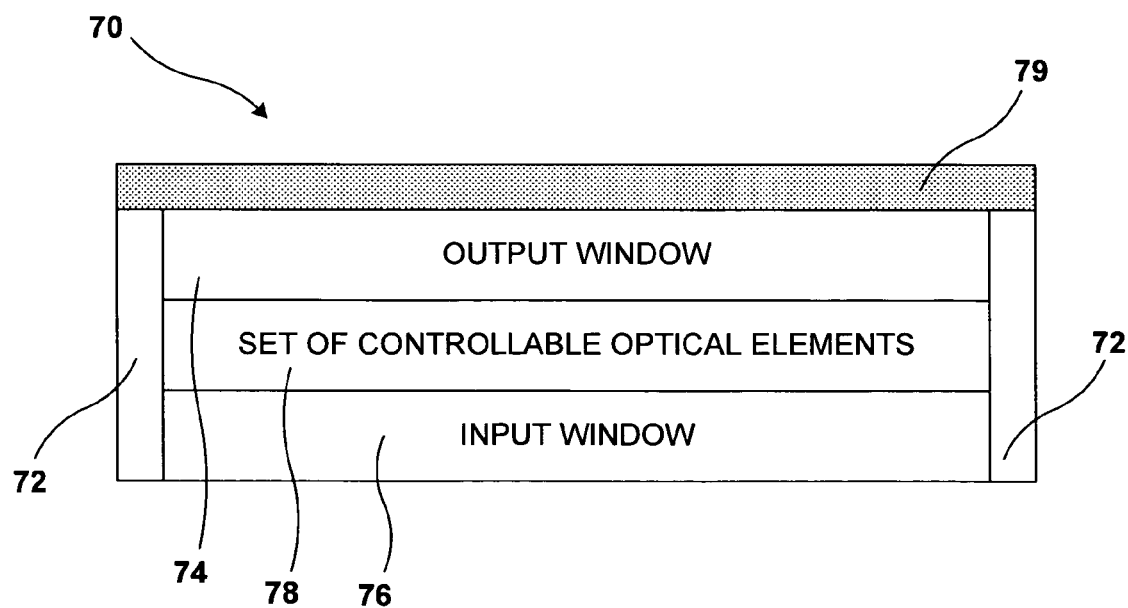

FIGS. 6 and 7 are conceptual side views of spatial light modulator devices according to embodiments of the invention. Spatial light modulator device 60 of FIG. 6 includes a housing 62 including a substantially transparent input window 64 and output window 66. A set of controllable optical elements 68 reside within housing. Spatial light modulator device 60 also includes a diffusive element 69, as described herein. In this example, diffusive element 69 comprises a two-layer diffusive laminate. In particular, diffusive element 69 may comprise a textured polycarbonate layer 65 roll-embossed onto an acrylated epoxy adhesive layer 67. The textured polycarbonate layer 65, for example, may define a substantially random roughness in the layer. The difference in index of refraction between layer 65 and layer 67 defines the level of light scattering of diffusive element 69. The scattering should not be so excessive so as to direct output light away from subsequent lenses or collection optics, but should be sufficient to reduce zero-order burning at a Fourier transform plane. For example, if lens 18C (FIG. 1) incorporates F/2 optics, the maximum capture angle may be +/- approximately 14 degrees. In this case, scattering by less than approximately 10 degrees is preferred to ensure that output light does not escape the subsequent lenses or collection optics. Higher quality optics, such as F/1 optical lenses may allow for increased scattering without loss of light.

The difference in index of refraction between layer 65 and layer 67 may be greater than 0.02, and preferably between 0.02 and 0.05. Furthermore, as the depth of surface roughness of textured polycarbonate layer 65 increases, the degree of scattering increases. Accordingly, the roughness of textured polycarbonate layer 65 should also be considered in the layer design. Substantially random roughness defined by random texture protrusions or depression on the order of 0.5 to 2.5 micron relative to a flat plane should provide satisfactory results.

The polycarbonate of layer 65 may have an index of refraction of approximately n=1.57. The index of refraction of layer 67 should be selected based on that of layer 65 or vice versa for the optical wavelength used, such that the difference in index of refraction between layer 65 and layer 67 may be greater than 0.02. By way of example, acrylated epoxy adhesive layer 67 may comprise optical adhesive having an index of refraction within a range of approximately 1.51 to 1.56. Examples include NOA61, NOA63, NOA65, NOA72, and NOA76 commercially available from Norland Products Incorporated of Cranbury, N.J. In general, any optically clear adhesive layer with suitably mis-matched index of refraction relative to textured plastic layer may function as the scattering laminate layer.

Spatial light modulator device 70 of FIG. 7 is very similar to device 60 of FIG. 6. Device 70 includes a housing 72, and housing 72 includes a substantially transparent input window 76 and output window 74. A set of controllable optical elements 78 reside within housing 72. Spatial light modulator device 70 also includes a diffusive element 79, as described herein. In this example, however, diffusive element 70 comprises a mixture of two optically dissimilar materials that are uniformly mixed and then phase separated to form micron-sized scattering spheroids of relatively modest scattering angles, e.g., a few degrees or less. One material mixture that ably demonstrates this desired effect is a polymer dispersed liquid crystal material, comprised of a multifunctional acrylate mixture and a nematic liquid crystal such as E7 or TL205. Still other types of diffusive elements may also be used in accordance with the invention.

In an added embodiment, the invention contemplates a reflective-mode spatial light modulator device in which the controllable optical elements comprise controllable diffusive mirrors rather than controllable secular mirrors. In that case, the controllable diffusive mirrors may provide the desirable scattering, as described herein, without the need for a diffusive laminate or other diffusive element at the output window. Instead, the spatial light modulator device may include a housing formed with a window, and a set of controllable optical elements within the housing. The controllable optical elements may comprise controllable diffusive mirrors. Light is input through the window, and reflected off the controllable diffusive mirrors to encode a bit map into the light. The scattering effect caused by the diffusive mirrors can reduce the zero-order intensity of the zero-order Fourier component at a Fourier transform plane, and thereby reduce zero-order burning by Fourier transformed holograms.

Various embodiments of the invention have been described. For example, a spatial light modulator device has been described that can improve holographic data recording systems. The spatial light modulator device incorporates a diffusive element to scatter a data encoded object beam. Examples of the diffusive element include a two-layer diffusive laminate and polymer dispersed liquid crystal materials. The diffusive element can be formed over an output window of the spatial light modulator device. The scattering can significantly reduce undesirable zero-order burning effects that otherwise occur in a media plane in close proximity to a Fourier transform plane. The invention may be embodied in a spatial light modulator device, a holographic recording system, or various methods executed by the spatial light modulator device or the holographic recording system.

Nevertheless, various modifications may be made to the embodiments described herein. For example, although the invention has been described primarily in the context of transmissive spatial light modulators that include a set of elements that can be made transmissive or opaque, the invention may also find application in reflective-mode spatial light modulators. If mirror elements are used in a reflective-type spatial light modulator, however, the output light may exit from the same side as the input light. In that case, the diffusive element described herein may only cover part of the input/output window such that non-scattered light can be input to the device, reflected by the elements, and then scattered by the diffusive element. However, the invention may also work if light is scattered both before and after encoding via the controllable elements. Also, in added embodiments, the invention contemplates the use of diffusive reflective elements for the set of controllable optical elements of the spatial light modulator device.

In still other embodiments, a diffusive laminate may be useful for non-holographic applications. For example, a diffusive laminate may be useful for "softening" pixel boundaries in projector applications, or may be useful in any of a wide variety of other applications where SLMs are used. These and other embodiments are within the scope of the following claims.

The invention claimed is:

1. A spatial light modulator device for holographic data storage comprising:
   a set of controllable optical elements to create a data encoded object beam from an input light source, wherein the controllable optical elements comprise transmissive elements that are individually controllable to be either optically transmissive or opaque and wherein the controllable optical elements are controlled to define a bit map to be stored as a hologram; and
   a diffusive element positioned in proximity to the set of controllable optical elements to diffuse the data encoded object beam created by the set of controllable optical elements.

2. The spatial light modulator device of claim 1, wherein the device includes an output window and wherein the diffusive element is positioned over at least a portion of the output window.

3. The spatial light modulator device of claim 1, wherein the device includes an output window and wherein the diffusive element comprises at least a portion of the output window.

4. The spatial light modulator device of claim 1, wherein the diffusive element comprises a two-layer diffusive laminate.

5. The spatial light modulator device of claim 4, wherein the two-layer diffusive laminate comprises a first layer including a textured polycarbonate roll-embossed onto a second layer including an acrylated epoxy adhesive.

6. The spatial light modulator device of claim 4, wherein an index of refraction difference between layers of the two-layer diffusive laminate is between approximately 0.02 and 0.05.

7. The spatial light modulator device of claim 1, wherein the diffusive element comprises a polymer dispersed liquid crystal material.

8. A method of holographic data storage comprising:
   encoding data into a light beam using a set of controllable optical elements of a spatial light modulator device, wherein the controllable optical elements comprise transmissive elements that are individually controllable to be either optically transmissive or opaque and wherein the data comprises a bit map to be stored as a hologram; and
   diffusing the encoded light beam output by the set of controllable optical elements using a diffusive element of the spatial light modulator device, the diffusive element being positioned in proximity to the set of controllable optical elements.

9. The method of claim 8, wherein the spatial light modulator device includes an output window and wherein the diffusive element is positioned over at least a portion of the output window.

10. The method of claim 8, wherein the spatial light modulator device includes an output window and wherein the diffusive element comprises at least a portion of the output window.

11. The method of claim 8, wherein the diffusive element comprises a two-layer diffusive laminate.

12. The method of claim 11, wherein the two-layer diffusive laminate comprises a textured polycarbonate layer roll-embossed onto an acrylated epoxy adhesive layer.

13. The method of claim 8, wherein the diffusive element comprises a polymer dispersed liquid crystal material.

14. The method of claim 8, further comprising:
controlling the set of controllable optical elements to define the bit map encoded into the light beam;
creating a reference beam; and
causing the diffused and encoded light beam to interfere with the reference beam in proximity to a Fourier transform plane to store a hologram in a holographic medium.

15. A holographic data storage system comprising:
a holographic medium;
a laser to create a laser beam;
optical elements to separate the laser beam into a reference beam and an input light source; and
a spatial light modulator device positioned to define an image plane, the spatial light modulator device comprising a set of controllable optical elements to create a data encoded object beam from the input light source, wherein the controllable optical elements comprise transmissive elements that are individually controllable to be either optically transmissive or opaque and wherein the controllable optical elements are controlled to define a bit map to be stored as a hologram, and a diffusive element positioned in proximity to the set of controllable optical elements to diffuse the data encoded object beam created by the set of controllable optical elements, wherein the system is arranged such that the data encoded object beam and reference beam interfere in the holographic medium at a Fourier transform plane to create the hologram in the holographic medium.

* * * * *